United States Patent Office 3,367,442
Patented Feb. 6, 1968

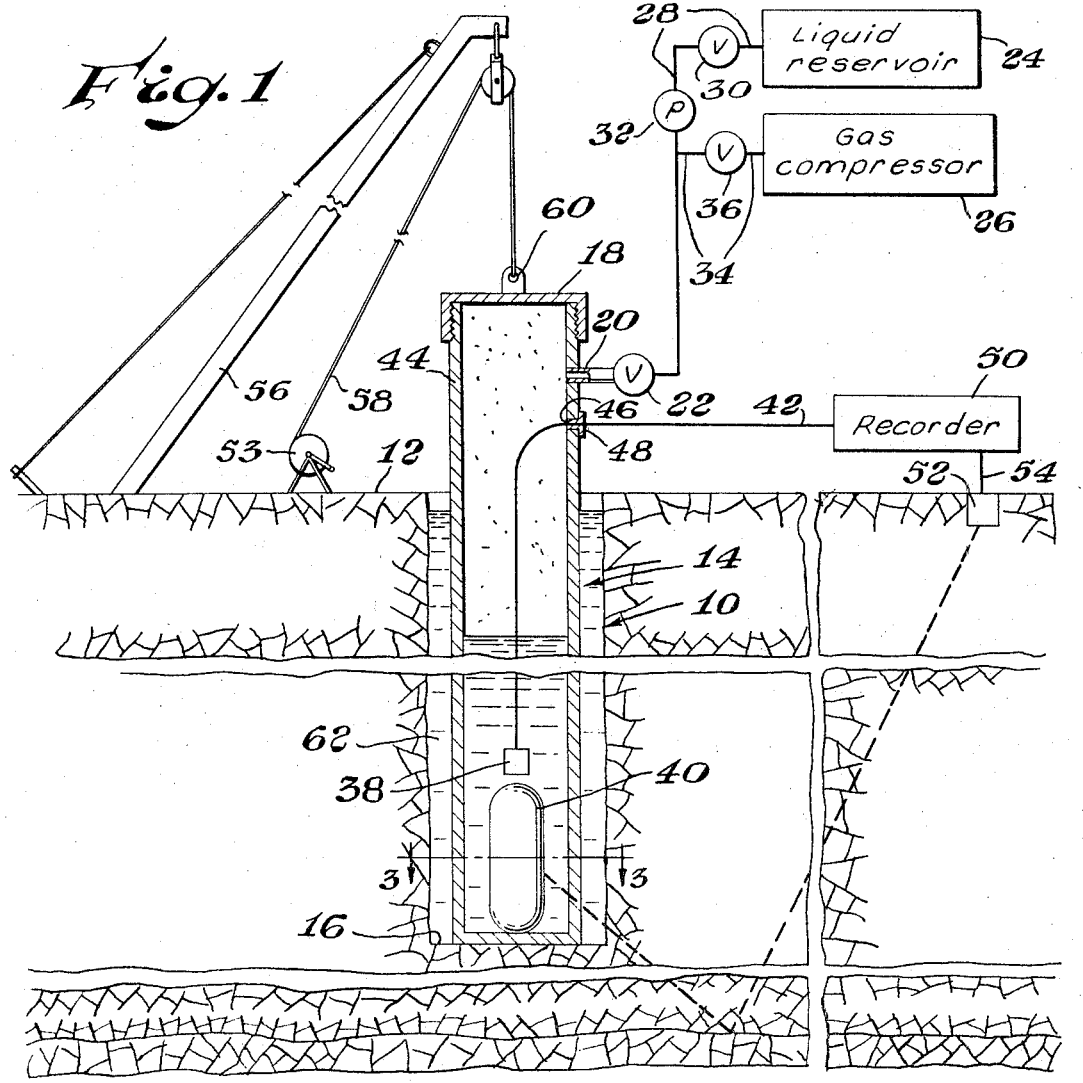
*Fig. 1*
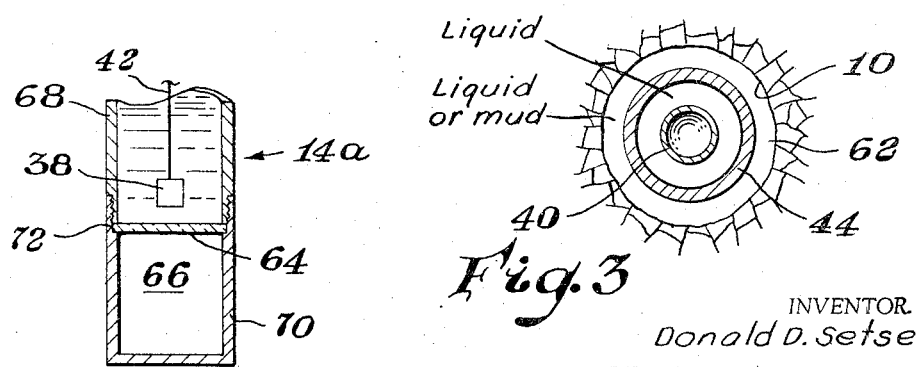
*Fig. 2*
*Fig. 3*
INVENTOR.
Donald D. Setser
BY Earl D. Ayers
AGENT

3,367,442
PORTABLE SEISMIC SURVEY APPARATUS
WITH AN IMPLODABLE DEVICE
Donald D. Setser, Tulsa, Okla., assignor to The Dow
Chemical Company, Midland, Mich., a corporation of
Delaware
Filed Dec. 19, 1963, Ser. No. 331,692
8 Claims. (Cl. 181—.5)

This invention relates to seismic exploration of earth strata and particularly to a method and apparatus for producing and transmitting high energy pulses through earth strata.

In the past in reflection seismographic survey work it has been common practice to detonate a charge of dynamite or other explosive in a shot hole and then measure reflected energy by means of geophones spaced in a predetermined pattern with respect to the shot hole.

The use of a bundle of sticks of dynamite or similar explosive material as the energy source in the shot hole has some undesirable features. For example, where the sticks of dynamite do not explode simultaneously, interference in the reflected wave resulting from the very closely spaced multiple explosions sometimes causes spurious reflection waves to be measured at one or more geophones. Further, dynamite and other explosives are by their nature hazardous to use. In addition, the detonation of dynamite in a shot hole usually damages the shot hole to such an extent that the hole may not be re-used for another shot in event the recorded pattern of reflections from the first shot is inconclusive.

Accordingly, a principal object of this invention is to provide an improved shot energizing method and means for use in generating seismic waves.

Another object of this invention is to provide an improved, safer means for generating seismic waves.

A further object of this invention is to provide an improved, safe, and convenient-to-use seismic wave energizing means which minimizes interference with the waves reflected from earth strata when said means is utilized in reflection seismographic work.

Yet another object of this invention is to provide improved means for energizing seismic waves which leaves the shot hole in re-usable condition.

In accordance with this invention a frangible implosion device is collapsed under fluid pressure in an enclosed container disposed at least partially within a shot hole to generate a pulse of seismic energy which is very short in duration and of very high amplitude. Tamping means, fluid or otherwise, in the shot hole are used to achieve the proper coupling of the container to the surrounding earth strata. The size, wall thickness and material of which the implodable device (a capsule, for example) is made may be adjusted so the device will implode at a predetermined pressure.

Pressurized liquid or liquid and gas are used to implode the implosion device.

The invention, as well as additional objects and advantages thereof, will best be understood when the following detailed description is read in connection with the accompanying drawings, in which:

FIG. 1 is a diagrammatical view of apparatus in accordance with the present invention;

FIG. 2 is a fragmentary view of alternative implosion apparatus in accordance with the present invention; and FIG. 3 is a sectional view taken along the lines 3—3 of FIG. 1.

Referring to the drawing, there is shown a shot hole or bore hole 10 which extends into the earth 12. A closed ended walled container, indicated generally by the numeral 14, is disposed at least partially within the shot hole 10, usually, but not necessarily, resting on the bottom 16 of the hole.

The container 14 is made of material, such as steel, for example, of such strength that it can withstand without bursting the pressurization and implosive force it encounters during usage.

Closure means, such as a detachable cap 18, for example, is coupled to the upper end of the container 14. The container has inlet means, such as the tubular element 20, for example, and valve 22, usually disposed near the upper end and extending through the wall 44, whereby fluid may be dispensed into and out of the container.

A liquid reservoir 24 and gas compressor 26 are each coupled to the valve 22 through the line 28, valve 30, pump 32 and through the line 34 and valve 36, respectively. A sound transducer 38 is disposed in the container 14, usually adjacent to the device to be imploded, such as the hollow frangible walled capsule 40, for example. The transducer 38 is coupled, by means of an electrical cable 42 which extends through the wall 44 (or end, alternatively) of the container 14 by means of a bore 46 and packing gland 48 to a suitable recorder 50. A geophone 52 (or geophones) coupled to the earth at a predetermined distance from the shot hole 10, is electrically coupled by means of the cable 54 to the recorder 50.

The container may be lowered into or raised out of the shot hole 10 by means of a windlass structure 53, gin poles 56, and cable 58 attached to a connector element 60 on the container, for example.

The annular space between the shot hole wall and the walls 44 of the container 14 and the space between the bottom of the shot hole and the lower end of the container are filled with a liquid such as water or brine or a drilling mud slurry, for example, designated as 62, to provide suitable coupling between the container and the adjacent earth formations.

In operation, the cover 18 of the container 14 is removed and the capsule 40 (implodable element) is inserted so that when the container is in the shot hole the capsule will be on or near to the bottom of the container. The container is then closed by attaching the cap 18 or other closure means, and is coupled as outlined heretofore to the liquid reservoir 24 and gas compressor 26. The coupling to the reservoir 24 and compressor 26 may be done either before or after the container is placed in the shot hole.

Alternatively, the implodable element, if in capsule form, may be lowered into the container 14 while the container is in the shot hole 10 by means of a suitable harness (not shown) which more or less surrounds the element. This type of loading of the container 14 with a capsule 40 is especially advantageous when more than one "shot" or implosion is to be made in the same shot hole.

With the geophone in place and both the geophone 52 (or other detector of elastic waves) and transducer 38 coupled to the recorder 50, sufficient liquid is pumped into the container 14 (valves 22 and 30 open, valve 36 closed) to surround and cover the capsule 40 plus an additional amount of liquid which is at least in excess of the volume displaced by the capsule 40. The container 14 may be filled with liquid if the volume of liquid is such that it is compressed by an amount which exceeds the volume of the capsule 40.

However, when the length of the container is short (and consequently the volume small in a narrow diameter shot hole), it is often not possible to sufficiently compress the liquid in the container or to expand the container to the extent that the compression of the compressed liquid and the increased volume due to elastic expansion of the container exceeds the volume displacement of the implodable element. In such instances, after the predetermined amount of liquid is pumped into the container, e.g., an amount which covers the implodable element and enough in addition to exceed the volume which is displaced by the implodable element in the container, the valve 32 is closed, the valve 36 is opened, and compressed gas is pumped into the container to build up the pressure therein to an amount wherein the implodable element or capsule 40 implodes.

As the capsule (imploding element) 40 implodes, the compressed fluid in the container 14 rushes in to fill the space formerly enclosed by the caysule (which had low internal pressure as compared to the pressure required to implode it), creating a shock wave, for example, which passes through the container 14, the liquid or slurry 62 which serves as coupling material, and the earth formations adjacent to and below the container 14. The implosion of the capsule 40 causes an indexing signal to be produced in the transducer 38 and be registered at the recorder 50. Signals subsequently induced in the geophone or geophones 52 are likewise coupled to the recorder 50, the subsequently induced signals being those which reach the geophone (or geophones) somewhat later in time as a result of their reflection from sub-surface formations as is well known to those skilled in the art.

The shock wave generated in accordance with this invention is a "clean" shock wave. That is, it has little or none of the interference aspects which are present when sticks of dynamite are detonated in a shot hole.

Another advantage accruing to the use of this invention is that the test hole may be used for many so-called "shots," whereas when dynamite or other explosive is used as the means for creating the shock wave the shot hole is often (if not usually, in fact) damaged to the extent that it cannot be used for subsequent shots, or if usable, does not duplicate the results between successive shots where identical explosive charges are used.

A further advantage of this invention is that the entire operation is safer because no explosives are used.

Another form of apparatus used in seismic survey work is a weight dropping machine in which a very heavy dropping element, often weighing several tons, is raised above the surface of the earth and then dropped. The dropped element damages (or at least disturbs) the earth structure where it is dropped, thus preventing the taking of a duplicate shot under the same conditions as the first shot at a particular location because of changes in coupling conditions in the earth.

The use of this invention does not result in damage to the shot hole, so "duplicate" shots may be made from the same shot hole.

While the shot holes may extend to a depth of 100 feet or even more, usually the shot hole depth is 30 feet or less. The rule of thumb for determining the depth of shot hole needed is to drill to a depth where one no longer encounters soft or unconsolidated earth. An exception to this rule is swampy soil where the water which is present in the soil provides good coupling to the container 14.

The embodiment of the invention shown in FIG. 2 may be substituted for that shown in FIGS. 1 and 3. In this embodiment no implodable capsule is used, but a frangible disc 64 is sealed across the lower part of the container 14a. The lower part of the container is composed of two separable sections 68, 70, the lower "plug-like" end section 70 having a shoulder part 72 on which the frangible disc-like element 64 rests. Suitable gaskets, not shown, may be placed between the element 64 and the shoulder surface on which the element 64 rests.

While the end section 70 is indicated as being joined to the upper part 68 of the container by threaded coupling means, other coupling means, such as clamps, for example, may be used.

The frangible element 64 may be disposed across the lower part 70 of the container in any suitable manner which seals the upper part of the container from the lower part, the particular means shown in FIG. 2 being only illustrative.

Further, the capsule or frangible disc need not necessarily be disposed at or near to the bottom of the container 14 or 14a, but that volume in the container 14a which is to be filled with liquid on implosion of the frangible disc 64 must be covered by at least enough liquid above the disc 64 to fill the evacuated or gas filled volume below when implosion of the disc occurs.

Usually, the gin poles 56, windlass 53, container 14 (or 14a), gas compressor, and possibly other equipment are mounted on a truck in order to permit easy movement of the apparatus from one location to another.

While the length of the container 14 is illustrated as extending from the bottom of the shot hole to above ground level, this length is, again, only illustrative. In many instances the container may be disposed entirely within the shot hole 10. In such instances the tubular element 20 extends upwardly and the valve 22 is then (usually) located at or above the surface of the earth. Or, alternatively, when it is easy to obtain good coupling with the earth, only a small part of the container may be disposed below the surface of the earth.

However, in most instances, good coupling between the container 14 and the earth is obtained when a substantial part of the container is disposed in a shot hole or its equivalent.

While capsules 40 of various types may be used, capsules of the types shown in FIGS. 1 and 2 of U.S. Patent No. 2,361,558 to Mason have been found to be satisfactory. Other capsules, made of a conventional formulation of borosilicate glass and which have tubular bodies and generally hemispherical ends, have been used.

One capsule, 4 inches in diameter and 24 inches long was disposed in the container and imploded in accordance with this invention at a pressure of 1930 p.s.i., gave good results.

The container 14 may be composed of a length or lengths of casing having a suitable inside diameter such as 5 inches or 6 inches, for example, which may conveniently be lowered into a shot hole.

In instances where the volume displaced by the capsule implodable element is such that the capsule would normally float in the liquid in the container, means such as a weighted element or harness having weights coupled thereto may be used to maintain the capsule in a suitable position in the container.

While capsules of any appropriate length and diameter may be used in accordance with this invention, capsule lengths of from 9 inches to 48 inches (and usually 4 inches in diameter) have been successfully used. In general, assuming the capsules are borosilicate glass and have the same wall thickness, the shorter length capsules implode at higher pressures.

The particular size and type of implodable element used is, of course, a matter of choice to be determined by the operator of the apparatus.

While pumping compressed gas into the container following a predetermined amount of liquid allows the greatest flexibility of the ratio of gas to liquid, a somewhat reversed process oftentimes suffices and is simpler. This process is to pump liquid into the container against the air which it normally contains, entrapping and compressing this air as the liquid fills the container. The thusly formed pocket of compressed air adds significantly to the ability of the total compressed fluid to fill the space formerly enclosed by the capsule.

What is claimed is:

1. In an apparatus for geophysical exploration in which elastic wave initiating apparatus is disposed at least near to the surface of the earth in a walled shot hole extending into the earth and detectors are disposed at or near the earth's surface and spaced from said initiating apparatus, said spaced detectors and a detector disposed closely adjacent to said initiating apparatus being coupled to a suitable recorder for indicating on a time base any signals detected, the improvement wherein said elastic wave initiating apparatus comprises a portable enclosed walled container having an implodable part of predetermined volume therein, said walled container being adapted to be moved from one shot hole to another, means for at least partially filling the interior of said container with liquid and for internally pressurizing said container, whereby implosion of said implodable part occurs, and means having a liquid base for coupling said container to the earth.

2. Apparatus in accordance with claim 1, wherein said implodable part is a hollow frangible element.

3. Apparatus in accordance with claim 1, wherein said implodable part comprises a frangible plate-like element sealed across said walled container intermediate of the ends of said container.

4. Apparatus in accordance with claim 1, wherein said predetermined volume is a minor fraction of the volume enclosed by said container.

5. Apparatus in accordance with claim 1, wherein said means for coupling said container to the earth includes a walled shot hole in which said container is disposed and a coupling medium comprising liquid disposed between said container and the walls of said shot hole.

6. Apparatus in accordance with claim 1, wherein said enclosed walled container is an elongated hollow member comprising detachable sections.

7. Apparatus in accordance with claim 1, wherein said means for at least partially filling the interior of said container and for internally pressurizing said container includes a liquid reservoir coupled through a pump to said container.

8. Apparatus in accordance with claim 7, wherein a gas compressor is also coupled to said container.

References Cited

UNITED STATES PATENTS

| | | | |
|---|---|---|---|
| 1,753,066 | 4/1930 | Poole et al. | 166—164 |
| 2,558,924 | 7/1951 | Blake | 181—.5 |
| 2,679,205 | 5/1954 | Piety | 181—.5 |
| 3,151,679 | 10/1964 | Karpovich et al. | 166—42.1 |
| 2,207,398 | 7/1940 | Floyd | 181—0.5 |

OTHER REFERENCES

Setser: "Implosions Improve Well Injectivity," The Oil and Gas Journal, March 1960 (pp. 92, 93).

BENJAMIN A. BORCHELT, *Primary Examiner.*

SAMUEL FEINBERG, *Examiner.*

W. KUJAWA, *Assistant Examiner.*